(12) United States Patent
Wang et al.

(10) Patent No.: US 11,883,772 B2
(45) Date of Patent: Jan. 30, 2024

(54) PRODUCT FOR METAL ADSORPTION

(71) Applicant: Active Minerals International, LLC, Sparks, MD (US)

(72) Inventors: Bo Wang, Union City, CA (US); Dennis Parker, Victor, ID (US)

(73) Assignee: Active Minerals International, LLC, Sparks, MD (US)

( * ) Notice: Subject to any disclaimer, the term of this patent is extended or adjusted under 35 U.S.C. 154(b) by 138 days.

(21) Appl. No.: 17/396,016

(22) Filed: Aug. 6, 2021

(65) Prior Publication Data

US 2023/0048090 A1  Feb. 16, 2023

(51) Int. Cl.
*B01D 53/04* (2006.01)
*C09D 183/08* (2006.01)

(52) U.S. Cl.
CPC ........... *B01D 53/04* (2013.01); *C09D 183/08* (2013.01); *B01D 2253/11* (2013.01); *B01D 2253/306* (2013.01); *B01D 2257/602* (2013.01)

(58) Field of Classification Search
CPC ..... B01D 53/04; B01J 20/12; B01J 20/28061; B01J 20/28076; B01J 20/28078; B01J 20/28088; B01J 20/3204; B01J 20/3259; C02F 1/288; C09D 183/08
See application file for complete search history.

(56) References Cited

U.S. PATENT DOCUMENTS

| | | | |
|---|---|---|---|
| 4,386,010 A | 5/1983 | Hildebrandt | |
| 7,871,524 B2 | 1/2011 | Wang et al. | |
| 8,357,303 B2 | 1/2013 | Angeles-Boza et al. | |
| 8,382,990 B2 | 2/2013 | Wang et al. | |
| 2020/0164341 A1 | 5/2020 | Wang | |

FOREIGN PATENT DOCUMENTS

| | | |
|---|---|---|
| CN | 101642696 B | 5/2011 |
| CN | 103071451 A | 5/2013 |
| CN | 104528863 A | 4/2015 |
| CN | 109046260 A | 12/2018 |
| CN | 110652962 A | 1/2020 |
| WO | 2008079919 A3 | 7/2008 |

(Continued)

OTHER PUBLICATIONS

International Search Report & Written Opinion related to Application No. PCT/US2022/038538; dated Oct. 27, 2022.

(Continued)

*Primary Examiner* — Sharon Pregler
(74) *Attorney, Agent, or Firm* — von Briesen & Roper, s.c.

(57) ABSTRACT

A product for adsorbing one or more heavy metals from a liquid is disclosed. The product may comprise attapulgite that has been surface functionalized with a surface coating agent that includes one or more mercury affinity functional groups that chemically bond to the attapulgite surface, wherein the weight percentage of components of the product includes: 91-99 wt. % attapulgite and 1-9 wt. % surface coating agent that includes the one or more mercury affinity functional groups. The product has a surface area in the range of 115-145 $m^2/g$ as measured using the BET method. The heavy metal includes mercury and/or lead. Also disclosed is a method of producing the product and a method of adsorbing at least one heavy metal in a liquid using the product.

8 Claims, 2 Drawing Sheets

(56) References Cited

FOREIGN PATENT DOCUMENTS

WO    2011107764 A1    9/2011

OTHER PUBLICATIONS

Xue et al., "Adsorption behaviors and mechanism of heavy metals onto attapulgite fictionalized by polyamine silane, Journal of the American Ceramic Society", Dec. 3, 2020, pp. 1-41, vol. 104, Iss. 4, https://sci-hub.se/10.1111/Jace.17604.

Yu et al., "Adsorption Properties of Polyethersulfone-Modified Attapulgite Hybrid Microspheres for Bisphenol A and Sulfamethoxazole, International Journal of Environment Research and Public Health", Jan. 11, 2020, pp. 1-14, vol. 17, No. 473, https://www.ncbi.nlm.nih.gov/pmc.articles/PMC7013762/.

Dong et al., "Enhanced nitrate-nitrogen removal by modified attapulgite-supported nanoscale zero-valent iron treating simulated groundwater, Journal of Environmental Management", Feb. 26, 2018, vol. 213, pp. 151-158.

Saleh et al., "Polyamide magnetic palygorskite for the simultaneous removal of Hg(II) and methyl mercury; with factorial design analysis, Journal of Environmental Management", Feb. 6, 2018, vol. 211, pp. 323-333.

Jin-Gang Yu, et al., "Removal of mercury by adsorption: a review", Environmental Science and Pollution Research, Aug. 12, 2015, https://link.springer.com/article/10.1007/s11356-015-5880-x.

Hao Cui, et al., "Adsorption of aqueous Hg (II) by a polyaniline/attapulgite composite", Chemical Engineering Journal, Sep. 29, 2012, vols. 211-212, pp. 216-223, https://www.sciencedirect.com/science/article/abs/pii/S138589471201248X?via%3Dihub.

Hao Cui, et al., "Fast removal of Hg (II) ions from aqueous solution by amine-modified attapulgite", Applied Clay Science, Feb. 10, 2013, vol. 72, pp. 84-90, https://www.sciencedirect.com/science/article/abs/pii/S0169131713000070.

Yan Zhou, et al., "Adsorption of Hg(II) in aqueous solutions using mercapto-functionalized alkali lignin", Applied Polymer Science, Mar. 22, 2014, https://onlinelibrary.wiley.com/doi/abs/10.1002/app.40749.

Tekin Sahan, et al., "Mercury(II) adsorption by a novel adsorbent mercapto-modified bentonite using ICP-OES and use of response surface methodology for optimization", Microchemical Journal, Jan. 17, 2018, vol. 138, pp. 360-368, https://www.sciencedirect.com/science/article/abs/pii/S0026265X17312158.

Wei Qin, et al., "Adsorption of Hg(II) ions by PAMAM dendrimers modified attapulgite composite", Reactive and Functional Polymers, Jan. 8, 2019, vol. 136, pp. 75-85, https://www.sciencedirect.com/science/article/abs/pii/S1381514818308770.

Xuefeng Liang, et al., "Preparation and characterization of mercapto functionalized sepiolite and their application for sorption of lead and cadmium", Aug. 23, 2011, vol. 174, pp. 436-444, https://www.sciencedirect.com/science/article/abs/pii/S1385894711010187.

PRODUCT FOR METAL ADSORPTION

TECHNICAL FIELD

The present disclosure generally relates to products comprising attapulgite that are suitable for the adsorption of one or more heavy metals from liquids.

BACKGROUND

Elements such as mercury and lead are naturally occurring heavy metals. Mercury, for example, can be found naturally in rocks, soil and crude oils and is widely used in various industrial production processes. Metal contaminants, such as mercury and lead can be found in oil, liquified natural gas and wastewater. Such toxic pollutants in industrial and municipal wastewaters is harmful to human health and the environment. Mercury in refinery hydrocarbon streams can cause catalyst poisoning, corrosion and safety issues.

Common commercially available mercury removal technologies include activated carbon adsorption, sulfur-impregnated activated carbon adsorption, separation by microemulsion liquid membranes, ion exchange and colloid precipitation. The slow kinetics, poor selectivity for mercury and low mercury loading capacity of these technologies make the mercury removal process less efficient and expensive due to the high cost of disposing large volume of waste.

U.S. Pat. No. 8,382,990, issued Feb. 26, 2013, (the '990 patent) describes a process for producing an extruded granular removal media of an onium ion intercalated coupling agent reacted layered bentonite for use in column filtering applications for removing mercury and arsenic from gas or water. While the disclosure of the '990 patent may be beneficial, an effective and less expensive removal media is desired that is capable of separating heavy metals such as mercury or lead from liquids.

SUMMARY OF THE DISCLOSURE

In one aspect of the present disclosure, a product for adsorbing one or more heavy metals from a liquid is disclosed. The product may comprise attapulgite that has been surface functionalized with a surface coating agent that includes one or more mercury affinity functional groups that chemically bond to the attapulgite surface, wherein the weight percentage of components of the product includes: 91-99 wt. % attapulgite and 1-9 wt. % surface coating agent that includes the one or more mercury affinity functional groups. The product has a surface area in the range of 115-145 $m^2/g$ as measured using the BET method. The heavy metal includes mercury and/or lead. In an embodiment, the product may have a particle size distribution having a $d_{50}$ of 6-18 microns or 8-17 microns or 8-16 microns. In any one or more of the embodiments above: the product may have a mercury removal efficiency of 60-100% in about 1-60 minutes in the liquid, at a loading of 0.1-1.25 g of the product per liter of the liquid; or the product may have a mercury removal efficiency of 90-100% in about 1-60 minutes in the liquid, at a loading of 0.4-1.25 g of the product per liter of the liquid; or the product may have a mercury removal efficiency of 95-100% in about 15-60 minutes in the liquid, at a loading of 0.4-1.25 g of the product per liter of the liquid; or the product may have a mercury removal efficiency of 97-100% in about 15-60 minutes in the liquid, at a loading of 0.9-1.25 g of the product per liter of the liquid. In a refinement of any of the embodiments above: the product may further have a lead removal efficiency of 40-70% in about 1-60 minutes in the liquid, at a loading of 0.1-1.25 g of the product per liter of the liquid; or the product may further have a lead removal efficiency of 45-70% in about 1-60 minutes in the liquid, at a loading of 0.4-1.25 g of the product per liter of the liquid; or the product may further have a lead removal efficiency of 50-70% in about 15-60 minutes in the liquid, at a loading of 0.4-1.25 g of the product per liter of the liquid; or the product may further have a lead removal efficiency of 55-70% in about 15-60 minutes in the liquid, at a loading of 0.9-1.25 g of the product per liter of the liquid. In any one or more of the embodiments or refinements above, the product may have a porosity of 60-90% or 68-82% or 68-78%. In any one or more of the embodiments or refinements above, the product may have (a) a pore volume of 1-3 ml/g and (b) a porosity of 68-78% and (c) intrinsic pores in the range of 7-30 nm and/or inter pores in the range of 1.5-32 microns. In any one or more of the embodiment or refinements above, the product may be in powder form or free of extrusion. In any one or more of the embodiments above, the liquid may include water, oil, liquified natural gas, wastewater, or combinations thereof.

In another aspect of the disclosure, a method of producing a product for adsorbing a heavy metal from a liquid is disclosed. The method may comprise surface treating attapulgite with a solution, the solution including a surface coating agent that includes one or more mercury affinity functional groups that chemically bond to the surface of the attapulgite, wherein the weight percentage of components of the product includes: 91-99 wt. % attapulgite, and 1-9 wt. % surface coating agent that includes the one or more mercury affinity functional groups, and wherein the product produced has a surface area in the range of 115-145 $m^2/g$ as measured using the BET method. The heavy metal is mercury and/or lead. The surface coating agent may comprise or may be: 3-mercaptopropyltrimethoxysilane; 3-(mercaptopropyl)triethoxysilane; 3-mercaptopropylmethyldimethoxysilane; (mercaptomethyl)dimethylethoxysilane; (mercaptomethyl)methyldiethoxysilane; 3-mercaptomethyltrimethoxysilane, 3-mercaptomethyltriethoxysilane, 11-mercaptoundecyltrimethoxysilane; or mixtures thereof. In one embodiment, the surface coating agent comprises or may be 3-(mercaptopropyl)triethoxysilane. In any one of the embodiments or refinements above, the solution further includes a solvent. In any one of the embodiments or refinements above, the solvent may include or may be methanol, ethanol, isopropanol, chloroform, toluene, or mixtures thereof. In any one of the embodiments or refinements above, the method may further comprise drying the attapulgite after the surface treating, wherein the solution is dried on the attapulgite of the product produced, and wherein the product produced may be in powder form and/or may be in a non-extruded form. In any one or more of the embodiments or refinements above, the product may have a particle size distribution having a $d_{50}$ of 8-16 microns or 8-17 microns. In any one or more of the embodiments or refinements above, the product may have a mercury removal efficiency of 60-100% in 1-60 minutes in the liquid, at a loading of 0.1-1.25 g of the product per liter of the liquid.

In yet another aspect of the disclosure, a method for adsorbing at least one heavy metal in a liquid is disclosed. The method may comprise: mixing for 1-60 minutes the liquid with a product comprising attapulgite that has been surface functionalized with a surface coating agent that includes one or more mercury affinity functional groups that chemically bond to the attapulgite surface; and separating the product from the liquid to recover a resultant liquid that has a lower amount of mercury and/or lead than the liquid had prior to the mixing. The weight percentage of the components of the product may include: 91-99 wt. % attapulgite, and 1-9 wt. % surface coating agent that includes the one or more mercury affinity functional groups, and the product may have a surface area in the range of 115-145 m$^2$/g as measured using the BET method. The heavy metal may include mercury and/or lead. In an embodiment, the removal efficiency of the product for mercury may be 60-100%, at a loading of 0.1-1.25 g of the product per liter of the liquid and/or the removal efficiency for lead may be 40-70%, at a loading of 0.1-1.25 g of the product per liter of the liquid. In an embodiment, the mixing may be for 15-60 minutes, and the removal efficiency of the product for mercury may be 95-100%, at a loading of 0.4-1.25 g of the product per liter of the liquid. In any one or more of the embodiments above, the liquid may include water, oil, liquified natural gas, wastewater, or combinations thereof.

DETAILED DESCRIPTION

Figure 1:
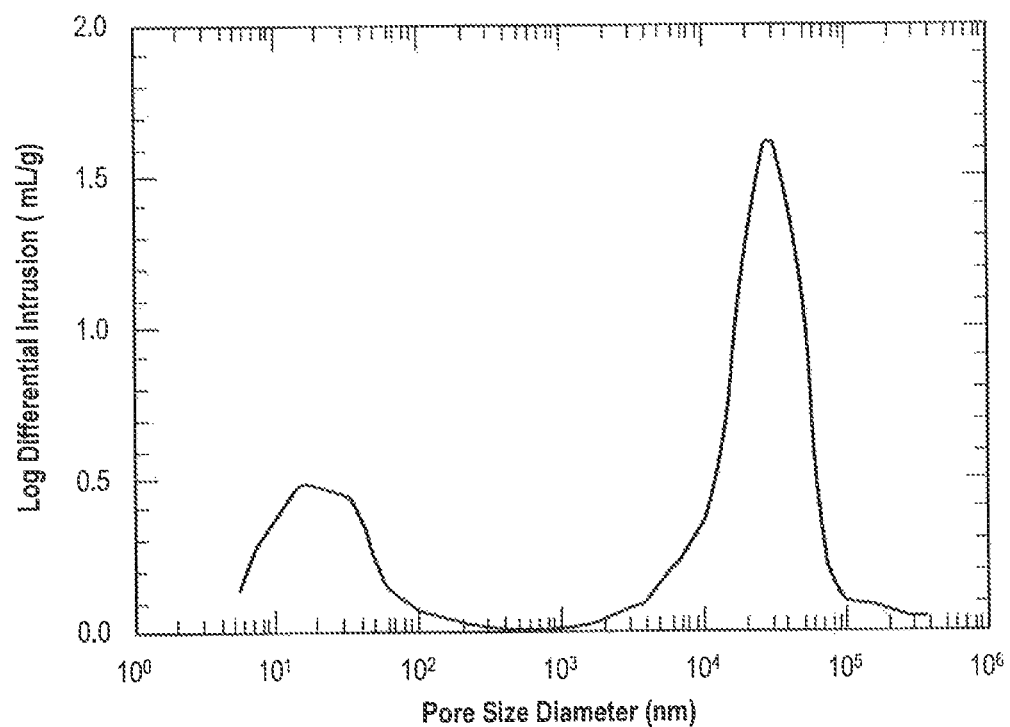
FIG. 1 is a graph illustrating the pore size distribution of Feed Material A, a natural attapulgite that has been purified and spray dried (Acti-Gel 208®)

This disclosure relates to products for heavy metal adsorption from liquids. The products disclosed herein comprise or may be attapulgite. Attapulgite is sometimes referred to as palygorskite. To avoid confusion, as used herein, the term "attapulgite" means attapulgite and/or palygorskite. As is known in the art, attapulgite is a chain crystal lattice type of clay mineral that is structurally different from other clays such as montmorillonite or bentonite. Namely, the tetrahedral sheets of attapulgite are divided into ribbons by inversion because adjacent hands of tetrahedra within one tetrahedral sheet point in opposite directions rather than in one direction thus creating a structure of ribbons of 2:1 layers joined at their edges, and the octahedral sheets are continuous in two dimensions only.

Typically, activated carbon is utilized for mercury adsorption. However, slow kinetics, poor selectivity for mercury and low mercury loading capacity of this material make the mercury removal process less efficient and quite expensive due to the high cost of disposing of large volumes of waste.

Disclosed herein are novel products that may be used as adsorbents for heavy metals such as ionic and elemental mercury and/or ionic and elemental lead in liquid. Such liquid may include, but is not limited to, water (e.g., freshwater, sea water, or the like), oil, liquified natural gas, wastewater or combinations thereof. For example, the liquid may include or may be water in oil, or oil in water.

Such novel product for reducing mercury and/or lead in such liquid may comprise attapulgite that has been surface functionalized with a surface coating agent that includes one or more mercury affinity functional groups that chemically bond to the attapulgite surface. The weight percentage of components of such product may include: 91-99 wt. % attapulgite and 1-9 wt. % surface coating agent that includes the one or more mercury affinity functional groups. The product or attapulgite (as feed material and after surface functionalization) has a surface area in the range of 115-145 m$^2$/g or 120-140 m$^2$/g as measured using the Brunauer-Emmett-Teller (BET) theory. The surface coating agent includes: one or more mercury affinity functional groups. In any one of the embodiments above the product or attapulgite (as feed material and/or after surface functionalization) may have a particle size distribution having a d$_{50}$ of 6-18 microns or 8-17 microns or 8-16 microns. In any one of the embodiments above the product or attapulgite (as feed material and/or after surface functionalization) may have a particle size distribution having a d$_{90}$ of 15-40 microns or 16-38 microns. In any one of the embodiments above the product or attapulgite (as feed material and/or after surface functionalization) has a porosity of 60-90%, or 68-82% or 68-78%. In any one of the embodiments above the product or attapulgite (as feed material and/or after surface functionalization) may have a pore volume of 1-3 mL/g or 1.1-2.0 mL/g or about 1.5 mL/g. In any one or more of the embodiments or refinements above, the product may have intrinsic pores in the range of 7-30 nm and/or inter pores in the range of 1.5-32 microns. In any one or more of the embodiments above, the product may be in powder form or non-extruded form (free of extrusion). In any one or more of the embodiments above, the attapulgite may be or may comprise: (a) natural attapulgite that prior to surface functionalization may be free of heat treatment (at 300° C. to about 900° C.), and/or free of calcination (e.g., at about 1010° C. or above), and/or free of agglomeration, and/or free of milling (e.g., jet milling); or (b) natural attapulgite that prior to surface functionalization may be milled (e.g., jet milled), and/or purified, and/or agglomerated (with or without a binder), and/or heat treated (at 300° C. to about 900° C., with or without a binder); or (c) natural attapulgite that prior to surface functionalization may be purified, agglomerated (with or without a binder), free of heat treatment (at 300° C. to about 900° C.) and free of calcination (e.g., at about 1000° C. or above); or (d) natural attapulgite that prior to surface functionalization may be purified, agglomerated (with or without a binder) and heat treated (at 300° C. to about 900° C., with or without a binder); or (e) natural attapulgite that prior to surface functionalization may be milled (e.g., jet milled), free of heat treatment (at 300° C. to about 900° C.), free of calcination (e.g., at about 1000° C. or above), and free of agglomeration. Such agglomeration may include agglomeration (with or without a binder) from mechanical processes (e.g., spray drying, high-shear mixing, or the like) or agglomeration (with or without a binder) from heat treatment (at 300° C. to about 900° C.) or calcination (about 1000° C. or above), or combinations thereof. In any one or more of the embodiments above, the attapulgite may be in powder form, in any one or more of the embodiments above, the attapulgite has not been extruded (is free of extrusion either before or after the surface functionalization).

In any one of the embodiments above, the product may have a mercury removal efficiency of 60%-100% and/or a lead removal efficiency of 40-70% in about 1-60 minutes contact time in the liquid, at a loading of 0.1-1.25 g of the product per liter of the liquid; in a refinement, the product may have a mercury removal efficiency of 90%-100% and/or a lead removal efficiency of 45-70% in about 1-60 minutes contact time in the liquid, at a loading of 0.4-1.25 g of the product per liter of the liquid; in another refinement, the product may have a mercury removal efficiency of 95%-100% and/or a lead removal efficiency of 50-70% in about 15-60 minutes contact time in the liquid, at a loading of 0.4-1.25 g of the product per liter of the liquid; in another refinement, the product may have a mercury removal efficiency of 97%-100% and/or a lead removal efficiency of 55-70% in about 15-60 minutes contact time in the liquid, at a loading of 0.9-1.25 g of the product per liter of the liquid.

Preparation of the Product

The method of producing, the products discussed above may comprise: selecting an attapulgite. In any one or more of the embodiments above, the attapulgite may be or may comprise: (a) natural attapulgite that prior to surface functionalization may be free of heat treatment (at 300° C. to about 900° C.), and/or free of calcination (e.g., at about 1000° C. or above), and/or free of agglomeration, and/or free of ruffling (e.g., jet milling); or (b) natural attapulgite that prior to surface functionalization may be milled (e.g., jet milled), and/or purified, and/or agglomerated (with or without a binder), and/or heat treated (at 300° C. to about 900° C., with or without a binder); or (c) natural attapulgite that prior to surface functionalization may be purified, agglomerated (with or without a binder), free of heat treatment (at 300° C. to about 900° C.) and free of calcination (e.g., at about 1000° C. or above); or (d) natural attapulgite that prior to surface functionalization may be purified, agglomerated (with or without a binder) and heat treated (at 300° C. to about 900° C., with or without a binder); or (e) natural attapulgite that prior to surface functionalization may be milled (e.g., jet milled), free of heat treatment (at 300° C. to about 900° C.), free of calcination (e.g., at about 1000° C. or above), and free of agglomeration. Such agglomeration may include agglomeration (with or without a binder) from mechanical processes (e.g., spray drying, high-shear mixing, or the like) or agglomeration (with or without a binder) from heat treatment (at 300° C. to about 900° C.) or calcination (about 1000° C. or above), or combinations thereof.

Agglomeration techniques (e.g., spray drying), with or without a hinder, are known by those of ordinary skill in the art in the clay industry. One exemplary known method of spray drying is to prepare a slurry of attapulgite and water, and utilize a spray dryer to disperse the slurry into droplets using high pressure nozzles, disks or the like. The temperature of the inlet and outlet air of the spray dryer depends on the dryer used. The droplets then become generally rounded agglomerations of attapulgite particles and are collected downstream of the drying chamber. Alternatively, other appropriate methods known in the art to spray dry clay or agglomerate clay (e.g, flash drying/heat treating below 900° C., fluid bed drying/heat treating below 900° C., use of a high-shear mixer, etc.) may be used.

Attapulgite/palygorskite is a magnesium aluminium phyllosilicate with the chemical formula $(Mg,Al)_2Si_4O_{10}(OH)\cdot 4H_2O$. The percentages of the various elements may vary depending on the deposit from which the attapulgite is sourced. The bulk chemistry of the attapulgite used as feed material impacts the extractable metal properties of the resulting product as such impurities can form extractable metals when the product comes into contact with liquid. Thus, the attapulgite may have undergone a purification process to reduce impurities prior to the surface functionalization disclosed herein. Such purification processes are known in the art.

The method further includes mixing a solvent with a surface coating agent to form a solution for surface coating. The surface coating agent includes one or more mercury affinity functional groups. In various embodiments discussed herein, the (surface coating) solution was prepared by mixing 1-5 g of a surface coating agent that included a mercury affinity functional group (e.g., (3-mercaptopropyl) triethoxysilane (Alfa Aesar™, 95%)) with 20 g of a solvent (e.g., ethanol) until well mixed (e.g., about 5-20 minutes). In other embodiments, the (surface coating) solution may comprise other appropriate amounts of surface coating agent and solvent. For example, the solution may comprise about 4.8 wt. % to about 31 wt. % of the surface coating agent having a mercury affinity functional group. Exemplary embodiments may include solutions prepared by mixing about 1 g to about 9 g of the surface coating agent that includes the mercury affinity functional group (e.g., (3-mercaptopropyl) triethoxysilane (Alfa Aesar™, 95%)) with about 20 g of the solvent (e.g., ethanol) until well mixed (e.g., about 5 to about 20 minutes). The solution may be mixed in any suitable vessel, for example a glass beaker, and a magnetic stirrer plate or the like may be utilized, if desired, to facilitate mixing.

The method further comprises surface treating the attapulgite with the (surface coating) solution to surface functionalize the attapulgite. To facilitate such surface treatment, the attapulgite may be mixed with the (surface coating) solution in a mixer (e.g., a Hobart 5-quart food mixer) until the solution is well dispersed and mixed into the attapulgite (e.g., mixing for about 5 to about 60 minutes at low speed). In the embodiments of Tables 4-5, about 95 g to about 99 g of the attapulgite feed material may be mixed with about 25 g to about 21 g of the (surface coating) solution in a Hobart 5-quart food mixer for about 30 minutes at low speed. In the embodiments of Tables 4-5, the ratio of the amount of solid (attapulgite) to the amount of liquid (the solution comprising the solvent (e.g., ethanol) and the surface coating agent that includes a mercury affinity functional group (e.g., Mercapto silane)) is in the range of about 3.8 to about 4.7. Furthermore, in the embodiments of Table 4-5, the ratio of the amount of surface coating agent (that includes the mercury affinity functional group) to the amount of attapulgite is in the range of about 0.01 to about 0.05. In other embodiments, other appropriate amounts of solution to attapulgite and other appropriate amounts of surface coating agent to attapulgite may be utilized to surface functionalize the attapulgite. For example, in other embodiments, about 91 g to about 99 g of the attapulgite feed material may be mixed with about 29 g to about 21 g of the (surface coating) solution in a Hobart 5-quart food mixer for about 5-60 minutes at low speed. In these other embodiments, the ratio of the amount of solid (attapulgite) to the amount of liquid (the solution comprising the solvent (e.g., ethanol) and the surface coating agent that includes a mercury affinity functional group (e.g., Mercapto silane)) may be in the range of about 3.1 to about 4.7. Furthermore, in such other embodiments, the ratio of the amount of surface coating agent (that includes the mercury affinity functional group) to the amount of attapulgite may be in the range of about 0.1 to about 0.01.

The method may further comprise: after the surface treating, drying the surface treated attapulgite (at about 60-70° C.) in an oven or the like for about 4-6 hours or until the attapulgite is dried (solution dried on the surface of the attapulgite particles). In the embodiment above, after mixing, the mixtures were dried at 60-70° C. in an oven for about 4 hours. In some embodiments, the product produced may be in powder form or may be in a non-extruded (free of extrusion) form. In some embodiments, the attapulgite particles of the resulting product may exhibit a generally rounded granular shape. In other embodiments, the attapulgite particles of the resulting product may exhibit irregular shape. After surface coating and drying, the mercury affinity groups are chemically bonded to the attapulgite surface.

The surface coating agent (that includes a mercury affinity functional group) may comprise or may be: 3-mercaptopropyltrimethoxysilane; 3-(mercaptopropyl)triethoxysilane; 3-mercaptopropylmethyldimethoxysilane; (mercaptomethyl)dimethylethoxysilane; (mercaptomethyl)methyldiethoxysilane; 3-mercaptomethyltrimethoxysilane, 3-mercaptomethyltriethoxysilane, 11-mercaptoundecyltrimethoxysilane; or mixtures thereof. The solvent may include or may be methanol, ethanol, isopropanol, chloroform, toluene, or mixtures thereof. In one embodiment, the surface coating agent may include or may be 3-(mercaptopropyl)triethoxysilane and the solvent may be ethanol.

Surface area measurement before and after the surface treatment of the attapulgite with the solution indicates that any change in surface area measurement attributable to such surface treatment was de minimus (see for example, Table 5).

Adsorption Process

The products disclosed herein may each be used to adsorb heavy metals, such as mercury and/or lead, in a liquid. The liquid may include, but is not limited to, water (e.g., freshwater, sea water, or the like), oil, liquified natural gas, wastewater or combinations thereof. For example, the liquid may include or may be water in oil, or oil in water. The method may comprise: mixing for a contact time of 1-60 minutes the liquid (from which heavy metals are to be removed) with any one of the products disclosed herein that (a) have a surface area in the range of 115-145 $m^2/g$ as measured using the BET method; and (b) comprise attapulgite that has been surface functionalized with a surface coating agent that includes one or more mercury affinity functional groups that chemically bond to the attapulgite surface, wherein the weight percentage of product components includes: about 91 wt. %-about 99 wt. % attapulgite; and about 9-about 1 wt. % surface coating agent that includes the one or more mercury affinity functional groups. The liquid and the product may form a slurry.

The loading is that amount of the product sufficient to reduce the amount of mercury and/or lead in the liquid in a given contact time such that a mercury efficiency of at least 60-100%, 90-100%, 95-100% or 97-100% is achieved. For example, in an embodiment, the product may have a mercury removal efficiency of 60%-100% and/or a lead removal efficiency of 40-70% in about 1-60 minutes contact time in the liquid, at a loading of 0.1-1.25 g of the product per liter of the liquid; in a refinement, the product may have a mercury removal efficiency of 90%-100% and/or a lead removal efficiency of 45-70% in about 1-60 minutes contact time in the liquid, at a loading of 0.4-1.25 g of the product per liter of the liquid; in another refinement, the product may have a mercury removal efficiency of 95%-100% and/or a lead removal efficiency of 50-70% in about 15-60 minutes contact time in the liquid, at a loading of 0.4-1.25 g of the product per liter of the liquid; in another refinement, the product may have a mercury removal efficiency of 97%-100% and/or a lead removal efficiency of 55-70% in about 15-60 minutes contact time in the liquid, at a loading of 0.9-1.25 g of the product per liter of the liquid.

The method further comprises separating the product from the liquid to recover a resultant liquid that has a lower amount of mercury and/or lead than the liquid had prior to the mixing. For example, the resultant liquid may be recovered from the slurry by filtration or any other appropriate method known to those of skill in the art. The products disclosed herein may be used as bodyfeed alone and/or precoat mixed with filter aids (such as diatomaceous earth and perlite) in the filtration system.

Other adsorption methods may be utilized. Such other adsorption methods may include passing mercury containing liquids through columns packed with the surface functionalized attapulgite disclosed herein. The contact time may be adjusted by varying process parameters such as column length, column diameter, adsorbent packing density, and/or liquid flow rate, etc.

Description of Test Methods

Surface Area, Pore Volume, Pore Size Distribution, Porosity

Surface area was measured by the nitrogen adsorption method of the BET (Brunauer-Emmett-Teller) method. Pore volume and pore size distribution of a sample of material was determined by mercury porosimetry. The mercury porosimetry uses mercury as an intrusion fluid to measure pore volume of a (weighed) sample of material enclosed inside a sample chamber of a penetrometer. The sample chamber is evacuated to remove air from the pores of the sample. The sample chamber and penetrometer are filled with mercury. Since mercury does not wet the material surface, it must be forced into the pores by means of external pressure. Progressively higher pressure is applied to allow mercury to enter the pores. The required equilibrated pressure is inversely proportional to the size of the pores, only slight pressure is required to intrude the mercury into macropores, whereas much greater external pressure is required to force mercury into small pores. The penetrometer reads the volume of mercury intruded and the intrusion data is used to calculate pore size distribution, porosity, average pore size and total pore volume. A Micromeritics AutoPore IV 9500 was used to analyze the samples herein.

Assuming pores of cylindrical shape, a surface distribution may be derived from the pore volume distribution for use in calculations. An estimate of the total surface area of the sample of material may be made from the pressure/volume curve (Rootare, 1967) without using a pore model as $$A = \frac{1}{\gamma\cos\theta} \int_{V_{Hg,0}}^{V_{Hg,max}} p \, dV$$

Where, $A$ = total surface area $\gamma$ = surface tension of the mercury $\theta$ = angle of contact of mercury with the material pore wall $p$ = external applied pressure $V$ = pore volume From the function V=V(p) the integral may be calculated by means of a numerical method.

From the pressure versus the mercury intrusion data, the instrument generates volume and size distribution of pores following the Washburn equation (Washburn, 1921) as:

$$d_i = \frac{4\gamma\cos\theta}{P_i}$$

Where, $d_i$ = diameter of pore at an equilibrated external pressure $\gamma$ = surface tension of the mercury $\theta$ = angle of contact of mercury with the material pore wall $P_i$ = external applied pressure The average pore diameter is determined from cumulative intrusion volume and total surface area of the sample of material as:

$$D = \frac{4V}{S}$$

Where, $D$ = average pore diameter $V$ = total intrusion volume of mercury $S$ = total surface area Porosity is the fraction of the total material volume that is taken up by the pore space. Porosity was calculated from mercury intrusion data.

Examples 1-4

The products of Examples 1-4 each comprise attapulgite. The products of Examples 1-4 were prepared from the different attapulgite feed materials listed in Table 1.

TABLE 1

Attapulgite Feed Materials.

| | Feed material | Surface Area (m²/g) | d10 (μm) | d50 (μm) | d90 (μm) |
|---|---|---|---|---|---|
| Feed Material A | Purified natural attapulgite product Acti-Gel 208 ® | 135 | 4.51 | 14.5 | 34.1 |
| Feed Material B | Acti-Gel 208 ® heat treated at 600° C. | 125 | | | |
| Feed Material C | Natural attapulgite | 125 | 3.89 | 13.49 | 33.93 |
| Feed Material D | Jet milled natural attapulgite | 130 | 2.87 | 8.20 | 17.12 |

Feed material A was prepared using the commercially available Acti-Gel 208® (Active Minerals International, LLC), an attapulgite product, as feed material. The Acti-Gel 208 product is natural attapulgite that has been purified and agglomerated via spray drying. As noted earlier, spray drying techniques are known to those of ordinary skill in the art in the clay industry. One exemplary known method is to prepare a slurry of attapulgite and water, and utilize a spray dryer to disperse the slurry into droplets using high pressure nozzles, disks or the like. The temperature of the inlet and outlet air of the spray dryer depends on the dryer used. The droplets then become generally rounded agglomerations of attapulgite particles and are collected downstream of a drying chamber. Alternatively, other appropriate methods known in the art may be used to spray dry clay or agglomerate clay (e.g, flash drying/heat treating below about 900° C., fluid bed drying/heat treating below about 900° C., flash drying/calcination (at about 1000° C. or above), fluid bed drying/calcination (at about 1000° C. or above), use of a high-shear mixer, or the like.) Such methods may be used with or without a binder.

The major elemental composition of Feed Material A, as determined by wave-length dispersive x-ray fluorescence (XRF) analysis for Acti-Gel 208, is shown in Table 2.

TABLE 2

Major Oxide Composition of purified natural attapulgite product Acti-Gel 208 used as feed material (Ignited Basis).

Total Chemistry as determined by XRF (expressed as oxides)[1]

| | |
|---|---|
| $SiO_2$ (wt. %) | 51.1 |
| $Al_2O_3$ (wt. %) | 10.8 |
| $Fe_2O_3$ (wt. %) | 3.5 |
| $CaO$ (wt. %) | 2.2 |
| $MgO$ (wt. %) | 8.4 |
| $Na_2O$ (wt. %) | 0.5 |
| $K_2O$ (wt. %) | 0.6 |
| $TiO_2$ (wt. %) | 0.4 |
| $P_2O_5$ (wt. %) | 0.6 |

[1]Although the elements are reported as oxides, they are actually present as complex aluminosilicates.

Feed Material B was prepared by placing 100 g of Acti-Gel 208 (natural attapulgite that has been purified and spray dried) material in a ceramic boat and heating in a muffle furnace for 30 minutes at 600° C.

Feed Material C was prepared using as feed material natural attapulgite mined near Climax, Ga. by Active Minerals International, LLC. The major elemental composition of this feed material, as determined by wave-length dispersive XRF analysis, is shown in Table 3.

TABLE 3

Major Oxide Composition of natural attapulgite material used as feed material (Ignited Basis).

Total Chemistry as determined by XRF (expressed as oxides)[1]

| | |
|---|---|
| $SiO_2$ (wt. %) | 66.2 |
| $Al_2O_3$ (wt. %) | 12.1 |
| $Fe_2O_3$ (wt. %) | 4.2 |
| $CaO$ (wt. %) | 2.8 |
| $MgO$ (wt. %) | 9.9 |
| $K_2O$ (wt. %) | 1.1 |
| $CO_2$ (wt. %) | 1.8 |
| $TiO_2$ (wt. %) | 0.6 |
| $P_2O_5$ (wt. %) | 1.0 |
| $SO_4$ (wt. %) | 0.2 |
| Other | 0.1 |

[1]Although the elements are reported as oxides, they are actually present as complex aluminosilicates.

Feed Material D was prepared by jet milling to grind natural attapulgite of Feed C that was mined near Climax, Ga. by Active Minerals International, LLC. A jet mill may also be referred to as "dense phase mill". A jet mill or a dense phase mill utilizes turbulent free jets in combination with a high efficiency centrifugal classifier in a common housing. Feed material comprising attapulgite is introduced into the common housing through an injector. Flooding the pulverizing zone with the feed material to a level above the grinding nozzles forms the mill load. Turbulent free jets are used to accelerate the particles of the feed material for impact and breakage. After impact the fluid (air) and size reduced particles (e.g., size reduced attapulgite particles) leave the bed and travel upwards to the centrifugal classifier. Based on the rotor speed, material (e.g., size reduced attapulgite particles) coarser than the desired size is recirculated back to the milling chamber, whereas the product is exited to a collection port. Hosokawa Alpine fluidized bed jet mill model 400 AFG is an exemplary jet mill that was utilized for grinding the attapulgite.

The feed materials A-D have a high surface area from 125 to 135 m²/g, as measured by the nitrogen adsorption method based on the Brunauer-Emmett-Teller (BET) theory. Particle size ($d_{50}$) of these feed materials, as measured by a laser particle size analyzer, is around 8-16 microns.

The feed materials A-D also contain about 9-14 wt. % moisture (at 104° C. (220° F.)). While not being bound by theory, the inventors believe that such moisture may facilitate mercapto silane bonding to the attapulgite surface. It is believed that the slime molecules may be first hydrolyzed by the trace quantities of water present on the surface of the attapulgite, followed by the formation of a covalent bond with the attapulgite surface.

FIG. 1 shows the pore size distribution of Feed Material A (as measured by mercury intrusion). As used herein, an "intrinsic pore" is a pore that is (a) disposed in the surface of a particle of attapulgite or (b) disposed in the structure of a particle of attapulgite. As used herein an "inter pore" is a pore that is (a) disposed between particles of attapulgite or (b) disposed between agglomerated particles of attapulgite. The bimodal distribution of FIG. 1 shows small intrinsic pores around 25 nanometers (nm), and large inter pores around 30 microns for the spray dried and purified natural attapulgite of Feed Material A (Acti-Gel 208). In addition, Feed Material A had a porosity of about 76% and a total intrusion volume of about 1.4931 mL/g, which indicates that Feed Material A is fairly porous. The inventors have found that surface functionalization of the feed material increased the porosity and total intrusion volume of such feed material (see for example, Table 6). The high surface area and unique porous structure of the products comprising surface functionalized attapulgite make these products effective adsorbents for various applications including mercury and/or lead adsorption. For Feed Material A and Feed Material B, the purified and spray dried attapulgite particles of the feed material had a generally rounded granular shape. The attapulgite particles of the Feed Material C and Feed Material D were more irregular in shape.

Table 4 shows Examples 1-4 were prepared from Feed Materials A-D, respectively, using surface functionalization treatment. For the attapulgite surface functionalization treatment, a solution for surface coating the attapulgite was prepared by mixing 5 g of (3-Mercaptopropyl)trimethoxysilane (Alfa Aesar™, 95%) with 20 g of ethanol for 10 minutes in a 100 ml glass beaker on a magnetic stirrer plate. 95 g of the attapulgite feed material was mixed with 25g of the (surface coating) solution in a Hobart 5-quart food mixer. After mixing for 30 minutes at low speed, the mixtures were dried at 60-70° C. in an oven for four hours. After surface functionalization, the attapulgite particles of Examples 1-2 still exhibited a generally rounded granular shape. After surface functionalization, the attapulgite particles of Examples 3-4 still exhibited irregular particle shape.

TABLE 4

Surface functionalized natural attapulgite with mercapto silane using different feed materials.

| | | Surface Coating Solution: (Ethanol and Mercapto Silane) | | Amount of Feed Material |
|---|---|---|---|---|
| Example | Feed Material (Attapulgite) | Ethanol (g) | Mercapto Silane (g) | (Attapulgite) (g) |
| Example 1 | Feed Material A | 20 | 5 | 95 |
| Example 2 | Feed Material B | 20 | 5 | 95 |
| Example 3 | Feed Material C | 20 | 5 | 95 |
| Example 4 | Feed Material D | 20 | 5 | 95 |

Examples 5-7

Examples 5-7 were prepared at varying amount of the mercapto silane loading levels to study the impact of the mercury affinity functional group on mercury removal. These examples were prepared using the same procedure as that for the previous examples except with different mercapto silane loading levels and a commercial mercapto silane (Silquest A-189, gamma-mercaptopropyltrimethoxysilane, Momentive). Feed Material C of natural attapulgite was used as the feed material.

TABLE 5

Surface functionalized natural attapulgite prepared at different mercapto silane loading levels.

| | Surface Coating Solution: (Ethanol and Mercapto Silane) | | Amount of Feed | |
|---|---|---|---|---|
| Example | Ethanol (g) | Mercapto Silane (g) | Material C (Attapulgite) (g) | Surface area ($m^2/g$) |
| Feed Material C | | | | 125 |
| Example 5 | 20 | 1 | 99 | 125 |
| Example 6 | 20 | 2 | 98 | 124 |
| Example 7 | 20 | 3 | 97 | 124 |

As shown in Table 5, the surface area measurement of the product comprising surface functionalized natural attapulgite (Examples 5-7) indicates that surface coating has de minimus effect on the surface area of the attapulgite.

Figure 2:
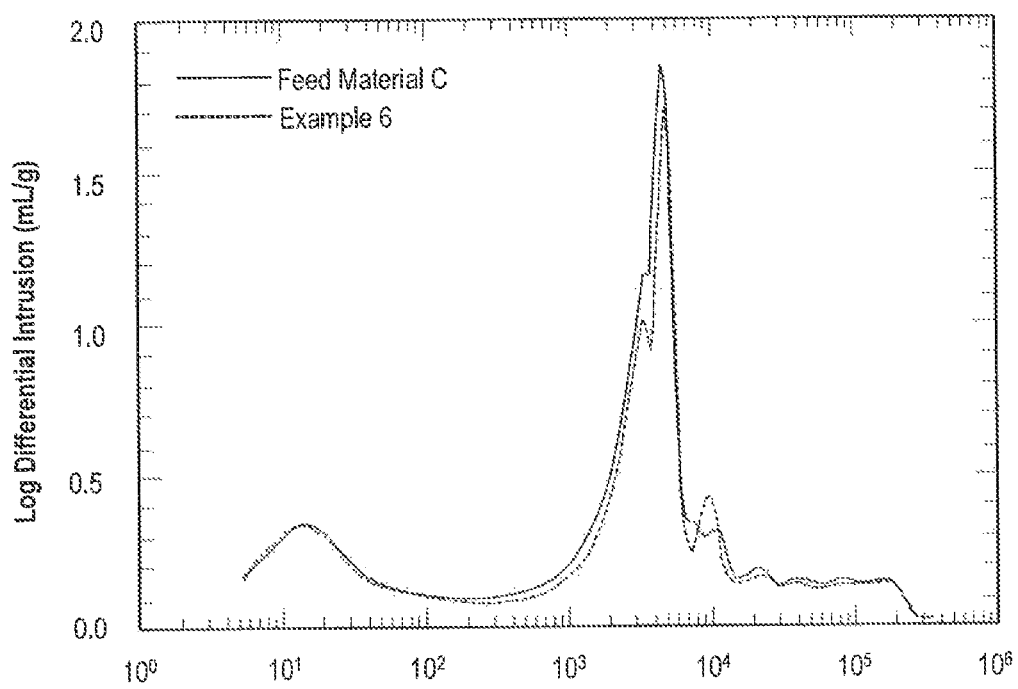
FIG. 2 is a graph illustrating the pore size distribution of Feed Material C of natural attapulgite and Example 6 of natural attapulgite surface functionalized with mercapto silane.

FIG. 2 shows the pore size distribution of Feed Material C and surface functionalized sample Example 6 (as measured by mercury intrusion). The bimodal distribution of FIG. 2 shows small intrinsic pores around 15 nm, and large inter pores around 5 microns for Feed Material C. As shown in Table 6, surface functionalization slightly increases pore volume and porosity. Table 6 also shows the particle size measured by a laser particle size analyzer increases slightly after surface functionalization with mercapto silane.

TABLE 6

Particle Size of Surface Functionalized Attapulgite.

| Example | $d_{10}$ (μm) | $d_{50}$ (μm) | $d_{90}$ (μm) | Pore Volume (mL/g) | Porosity (%) |
|---|---|---|---|---|---|
| Feed Material C | 3.89 | 13.49 | 33.93 | 1.1935 | 68 |
| Example 6 | 5.15 | 16.01 | 37.48 | 1.3046 | 72 |

Example 8

Influent mercury solutions were prepared by spiking 1000 ppm mercury standard solution into deionized (DI) water to make mercury concentrations around 10 ppm. Mercury concentrations were measured using Inductively Coupled Plasma (ICP) before and after the adsorption reaction.

For the mercury adsorption test, 0.1 g of adsorbent (Example 1, 2, 3 or 4) was mixed with 100 ml of the prepared mercury solution in a glass flask for 30 minutes on a magnetic stirrer plate at room temperature. Removal efficiency was calculated as follows:

Removal efficiency =
$$\frac{(\text{Influent Hg concentration} - \text{Residual Hg concentration}) \times 100}{\text{Influent Hg concentration}}$$

The results of the mercury adsorption test using a prepared solution with a high mercury concentration are shown in Table 7. Table 7 demonstrates that surface functionalized attapulgite disclosed herein is highly effective in mercury adsorption at a high mercury concentration around 10 ppm. Above 99% removal efficiency was achieved for the samples made from the different attapulgite feed materials of Examples 1-4.

TABLE 7

Mercury adsorption at high Hg concentration (around 10 ppm).

| Adsorbent | Adsorbent Loading (g/L) | Contact Time (min) | Influent Hg (ppb) | Residual Hg (ppb) | Removal efficiency |
|---|---|---|---|---|---|
| Example 1 | 1 | 30 | 9700 | 60.3 | 99.4 |
| Example 2 | 1 | 30 | 9700 | 80.1 | 99.2 |
| Example 3 | 1 | 30 | 9700 | 34.8 | 99.6 |
| Example 4 | 1 | 30 | 10300 | 85.0 | 99.2 |

Example 9

In Example 9, the impact of mercapto, the mercury affinity functional group, on mercury removal was studied by varying the amount of the mercapto silane loading levels. Mercury removal tests on Example 5-7 prepared with different mercapto silane loading levels were done at 1 g/L adsorbent loading with 30 minutes contact time. Table 8 shows that mercury removal efficiency increases significantly with the amount of mercury affinity mercapto functional groups attached to the attapulgite surface.

TABLE 8

Impact of mercapto silane loading on mercury removal.

| Adsorbent | Adsorbent Loading (g/L) | Contact Time (min) | Influent Hg (ppb) | Residual Hg (ppb) | Removal efficiency (%) |
|---|---|---|---|---|---|
| Feed Material C | 1 | 30 | 9960 | 8320 | 16.5 |
| Example 5 | 1 | 30 | 10600 | 2100 | 80.2 |
| Example 6 | 1 | 30 | 8510 | 135 | 98.4 |
| Example 7 | 1 | 30 | 8510 | 125 | 98.5 |

Example 10

Influent mercury solutions were prepared by spiking 1000 ppm mercury standard solution into DI water to make low mercury concentrations around 111 ppb. Mercury concentrations were measured using ICP before and after the adsorption reaction.

The results of a mercury adsorption test using a prepared solution with a low mercury concentration are shown in Table 9. Table 9 demonstrates that the surface functionalized attapulgite disclosed herein (each of Examples 1, 2, 3 or 4) is also highly effective in mercury adsorption at a low mercury concentration of 111 ppb. Above 95% removal efficiency was be achieved for the samples made from the different attapulgite feed materials.

TABLE 9

Mercury adsorption at low Hg concentration (111 ppb).

| Adsorbent | Adsorbent Loading (g/L) | Contact Time (min) | Influent Hg (ppb) | Residual Hg (ppb) | Removal efficiency (%) |
|---|---|---|---|---|---|
| Example 1 | 1 | 30 | 111 | 5 | 95.5 |
| Example 2 | 1 | 30 | 111 | 3 | 97.3 |
| Example 3 | 1 | 30 | 111 | 3 | 97.3 |
| Example 4 | 1 | 30 | 111 | 4 | 96.4 |

Example 11

Influent mercury solutions were prepared by spiking about 1000 ppm mercury standard solutions into DI water to make solutions with mercury concentrations around 10200 ppb, 11300 ppb and 9700 ppb. Mercury concentrations were measured using ICP before and after the adsorption reaction. The results of the mercury adsorption tests using Example 3 as the adsorbent and the prepared solutions with mercury concentrations are shown in Table 10. Table 10 demonstrates the impact of adsorbent loading levels on mercury adsorption. As can be seen from the results, mercury adsorption decreases with reducing adsorbent loading. About 45% removal can still be achieved even at very low sorbent loading of 0.125 g/L.

TABLE 10

Mercury adsorption at different adsorbent loading levels.

| Adsorbent | Adsorbent Loading (g/L) | Contact Time (min) | Influent Hg (ppb) | Residual Hg (ppb) | Removal efficiency (%) |
|---|---|---|---|---|---|
| Example 3 | 0.125 | 30 | 10200 | 5660 | 44.5 |
| Example 3 | 0.25 | 30 | 10200 | 2470 | 75.8 |
| Example 3 | 0.5 | 30 | 11300 | 599 | 94.7 |
| Example 3 | 1 | 30 | 9700 | 34.8 | 99.6 |

Example 12

The mercury adsorption test was carried out using commercial activated carbon (Filtrasorb 300, Calgon Carbon Corporation) as an adsorbent. Influent mercury solutions were prepared by spiking about 1000 ppm mercury standard solutions into DI water to make solutions with mercury concentrations around 9750 ppb and 10200 ppb. Mercury concentrations were measured using ICP before and after the adsorption reaction. The results of the mercury adsorption tests using the activated carbon as the adsorbent and the prepared solutions with mercury concentrations are shown in Table 11.

Figure 3:
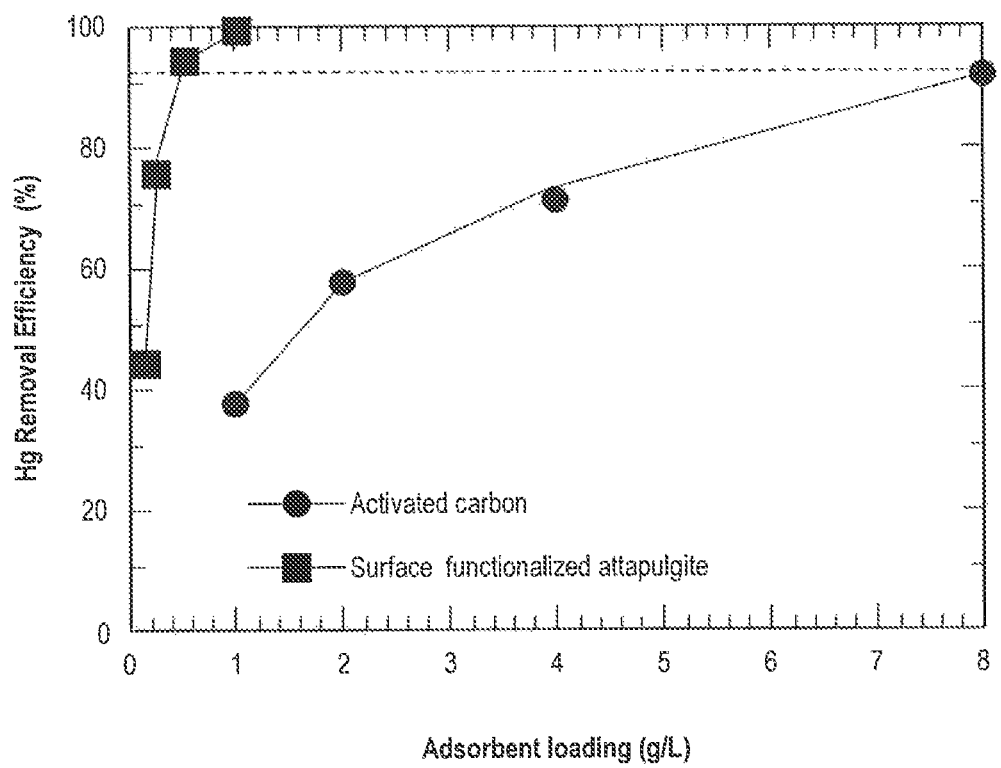
FIG. 3 is a graph showing the mercury removal efficiency versus adsorbent loading.

FIG. 3 illustrates the mercury removal efficiency versus adsorbent loading for activated carbon and for Example 3 (product comprising surface functionalized attapulgite). Table 11 and FIG. 3 demonstrate that such a product comprising surface functionalized attapulgite is significantly more effective in mercury removal than activated carbon.

Turning back to Table 10, it can be seen that at 0.5 g/L loading of the product of Example 3 (surface functionalized attapulgite) (Table 10), 94.7% removal efficiency is achieved. For comparison, 8 g/L loading of activated carbon (Table 11) is needed to achieve similar 91.8% removal efficiency, i.e., 16 times higher than surface functionalized attapulgite.

TABLE 11

Mercury adsorption at high Hg concentration.

| Adsorbent | Adsorbent Loading (g/L) | Contact Time (min) | Influent Hg (ppb) | Residual Hg (ppb) | Removal efficiency (%) |
|---|---|---|---|---|---|
| Activated carbon | 1 | 30 | 9750 | 6110 | 37.3 |
| Activated carbon | 2 | 30 | 10200 | 4790 | 57.6 |
| Activated carbon | 4 | 30 | 10200 | 2970 | 70.9 |
| Activated carbon | 8 | 30 | 10200 | 832 | 91.8 |

Example 13

For Example 13 influent mercury solutions were prepared by spiking about 1000 ppm mercury standard solutions into DI water to make solutions with mercury concentrations around 9160 ppb, 9700 ppb and 9750 ppb. Mercury concentrations were measured using ICP before and after the adsorption reaction. The results of the mercury adsorption tests are shown in Table 12. Table 12 demonstrates that the surface functionalized attapulgite disclosed herein adsorbs mercury significantly faster than activated carbon. 78.2% mercury removal can be achieved after 5 minutes contact with such surface functionalized attapulgite as compared to only 10.4% removal by activated carbon at the same conditions.

TABLE 12

Mercury adsorption with different contact time.

| Adsorbent | Adsorbent Loading (g/L) | Contact Time (min) | Influent Hg (ppb) | Residual Hg (ppb) | Removal efficiency |
|---|---|---|---|---|---|
| Example 3 | 1 | 5 | 9160 | 2000 | 78.2 |
| Activated carbon | 1 | 5 | 9160 | 8210 | 10.4 |
| Example 3 | 1 | 30 | 9700 | 34.8 | 99.6 |
| Activated carbon | 1 | 30 | 9750 | 6110 | 37.3 |

Example 14

The surface functionalized attapulgite disclosed herein was tested for other heavy metal adsorption. For Example 14 influent lead solutions were prepared by spiking 1000 ppm lead standard solutions into DI water to make solutions with lead concentrations around 10200 ppb. The adsorbent material of Example 3 was mixed with 10200 ppb lead solution at 1 g/L loading for 30 minutes. After adsorption, the lead concentration was reduced to 4400 ppb with a removal efficiency of 57%. Removal efficiency was calculated as follows:

$$\text{Removal efficiency} = \frac{(\text{Influent Pb concentration} - \text{Residual Pb concentration}) \times 100}{\text{Influent Pb concentration}}$$

INDUSTRIAL APPLICABILITY

In general, the foregoing disclosure finds utility in the removal of mercury and lead contained in liquids. Historically, common commercially available mercury removal technologies include activated carbon adsorption, sulfur-impregnated activated carbon adsorption, separation by microemulsion liquid membranes, ion exchange and colloid precipitation. The slow kinetics, poor selectivity for mercury and low mercury loading capacity of these technologies make the mercury removal process less efficient and expensive due to the high cost of disposing large volume of waste.

The novel product disclosed herein can be used as an adsorbent for reducing heavy metals such as mercury and/or lead in liquids. Such product have high removal efficiency for mercury and lead, which significantly reduces process time and provides greater removal of mercury and lead from liquids. Furthermore, compared to the commercially utilized activated carbon, the products disclosed herein may be used in significantly smaller quantities, which create less waste product to be disposed.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A product for adsorbing a heavy metal in a liquid, the product comprising attapulgite that includes 9-14 wt. % moisture as measured at 104° C., wherein the attapulgite has been surface functionalized with a surface coating agent that includes one or more mercury affinity functional groups that chemically bond to the attapulgite surface,
wherein the weight percentage of components of the product includes:
91 99 wt. % attapulgite and
1-9 wt. % surface coating agent that includes the one or more mercury affinity functional groups,
wherein the product has a surface area in the range of 115-145 m2/g as measured using the BET method,
wherein the heavy metal includes mercury and/or lead.

2. The product of claim 1, wherein the product has a particle size distribution having a d50 of 6-18 microns or 8-17 microns or 8-16 microns.

3. The product of claim 1, wherein the product is in powder form or free of extrusion.

4. The product of claim 1, wherein: the product has a mercury removal efficiency of 60-100% in 1-60 minutes in the liquid, at a loading of 0.1-1.25 g of the product per liter of the liquid; or the product has a mercury removal efficiency of 90-100% in 1-60 minutes in the liquid, at a loading of 0.4-1.25 g of the product per liter of the liquid; or the product has a mercury removal efficiency of 95-100% in 15-60 minutes in the liquid, at a loading of 0.4-1.25 g of the product per liter of the liquid; or the product has a mercury removal efficiency of 97-100% in 15-60 minutes in the liquid, at a loading of 0.9-1.25 g of the product per liter of the liquid.

5. The product of claim 4, wherein: the product has a lead removal efficiency of 40-70% in 1-60 minutes in the liquid, at a loading of 0.1-1.25 g of the product per liter of the liquid; or the product has a lead removal efficiency of 45-70% in 1-60 minutes in the liquid, at a loading of 0.4-1.25 g of the product per liter of the liquid; or the product has a lead removal efficiency of 50-70% in 15-60 minutes in the liquid, at a loading of 0.4-1.25 g of the product per liter of the liquid; or the product has a lead removal efficiency of 55-70% in 15-60 minutes in the liquid, at a loading of 0.9-1.25 g of the product per liter of the liquid.

6. The product of claim 1, wherein the product has a porosity of 60-90% or 68-82% or 68-78%.

7. The product of claim 1, wherein the liquid includes water, oil, liquified natural gas, wastewater, or combinations thereof.

8. The product of claim 1, wherein the product has (a) a pore volume of 1-3 ml/g and (b) a porosity of 68-78% and (c) intrinsic pores in the range of 7-30 nm and/or inter pores in the range of 1.5-32 microns.

* * * * *